(12) United States Patent
Kim et al.

(10) Patent No.: US 10,315,883 B2
(45) Date of Patent: Jun. 11, 2019

(54) AUTOMATIC FILAMENT EXCHANGING METHOD OF 3D PRINTERS

(71) Applicants: Han Sung Kim, Gwangju-si, Gyeonggi-do (KR); SANGMYUNG UNIVERSITY INDUSTRY-ACADEMY COOPERATION FOUNDATION, Seoul (KR)

(72) Inventors: Han Sung Kim, Gwangju-si (KR); In Bok Kong, Seoul (KR)

(73) Assignees: Han Sung Kim, Gwangju-si, Gyeonggi-do (KR); SANGMYUNG UNIVERSITY INDUSTRY-ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 15/779,545

(22) PCT Filed: Dec. 1, 2016

(86) PCT No.: PCT/KR2016/014040
§ 371 (c)(1),
(2) Date: May 29, 2018

(87) PCT Pub. No.: WO2017/095160
PCT Pub. Date: Jun. 8, 2017

(65) Prior Publication Data
US 2018/0362288 A1   Dec. 20, 2018

(30) Foreign Application Priority Data

Dec. 4, 2015 (KR) .......................... 10-2015-0172299

(51) Int. Cl.
*B65H 51/28* (2006.01)
*B65H 67/04* (2006.01)
*B65H 49/32* (2006.01)
*B65H 75/14* (2006.01)
(Continued)

(52) U.S. Cl.
CPC ......... *B65H 67/0422* (2013.01); *B65H 49/32* (2013.01); *B65H 51/28* (2013.01);
(Continued)

(58) Field of Classification Search
CPC .... B65H 67/0422; B65H 51/28; B29C 67/00; B33Y 50/00
See application file for complete search history.

(56) References Cited

U.S. PATENT DOCUMENTS 4,076,185 A * 2/1978 Dorph ................ A01K 89/0111
242/118.41
4,451,013 A * 5/1984 Bedrosian ............ B65H 75/146
191/12.4
(Continued)

FOREIGN PATENT DOCUMENTS

| JP | 08-327831 A | 12/1996 |
|---|---|---|
| JP | 2002-500966 A | 1/2002 |

(Continued)

OTHER PUBLICATIONS

International Search Report for PCT/KR2016/014040 dated Mar. 29, 2017 from Korean Intellectual Property Office.

*Primary Examiner* — Sang K Kim
(74) *Attorney, Agent, or Firm* — Revolution IP, PLLC

(57) ABSTRACT

An automated filament exchange method includes: locating the spool for winding the first filament for the 3D printer; winding the first filament on the subspace of the spool located at the spool location step; allowing the first filament wound at the subspace first filament winding step to pass through a gap formed on the main space flange located (Continued)

between the main space and the subspace; and winding the first filament located at the main space of the spool on the main space of the spool, wherein after the first filament is wound on the subspace of the spool, the first filament passes through the gap and is then wound multi-layeredly on the main space of the spool.

1 Claim, 8 Drawing Sheets

(51) Int. Cl.
    *B33Y 50/00*         (2015.01)
    *B29C 64/118*      (2017.01)

(52) U.S. Cl.
    CPC ............ *B65H 75/14* (2013.01); *B29C 64/118* (2017.08); *B33Y 50/00* (2014.12); *B65H 2404/6911* (2013.01); *B65H 2801/15* (2013.01)

(56) References Cited

U.S. PATENT DOCUMENTS

| | | | | |
|---|---|---|---|---|
| 4,667,896 A | * | 5/1987 | Frey | ............... B65H 75/18 |
| | | | | 242/118.41 |
| 4,696,438 A | * | 9/1987 | Myers | ............... B65H 55/00 |
| | | | | 242/118.41 |
| 6,022,207 A | | 2/2000 | Dahlin et al. | |
| 9,042,700 B2 | | 5/2015 | Smith et al. | |
| 9,891,399 B2 | * | 2/2018 | Krampotich | ........... B65H 49/28 |

FOREIGN PATENT DOCUMENTS

| | | |
|---|---|---|
| JP | 2014-231145 A | 12/2014 |
| KR | 10-2011-0083837 A | 7/2011 |

* cited by examiner

[FIG.2]

[FIG.4]
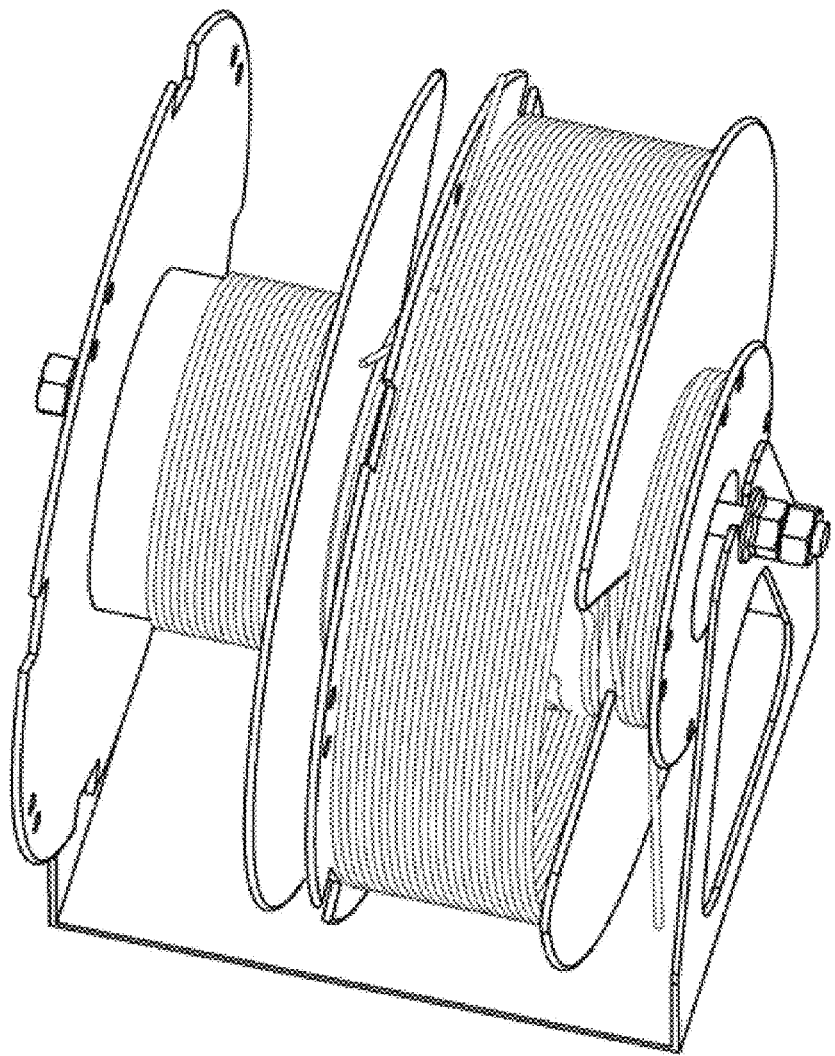

[FIG.5]
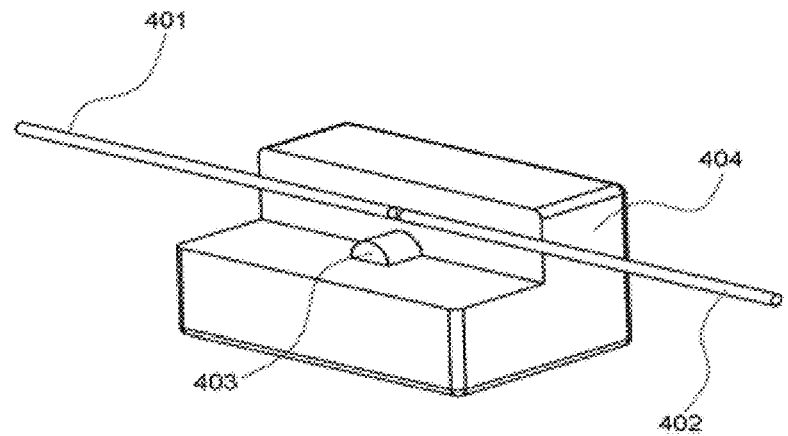
[FIG.6]
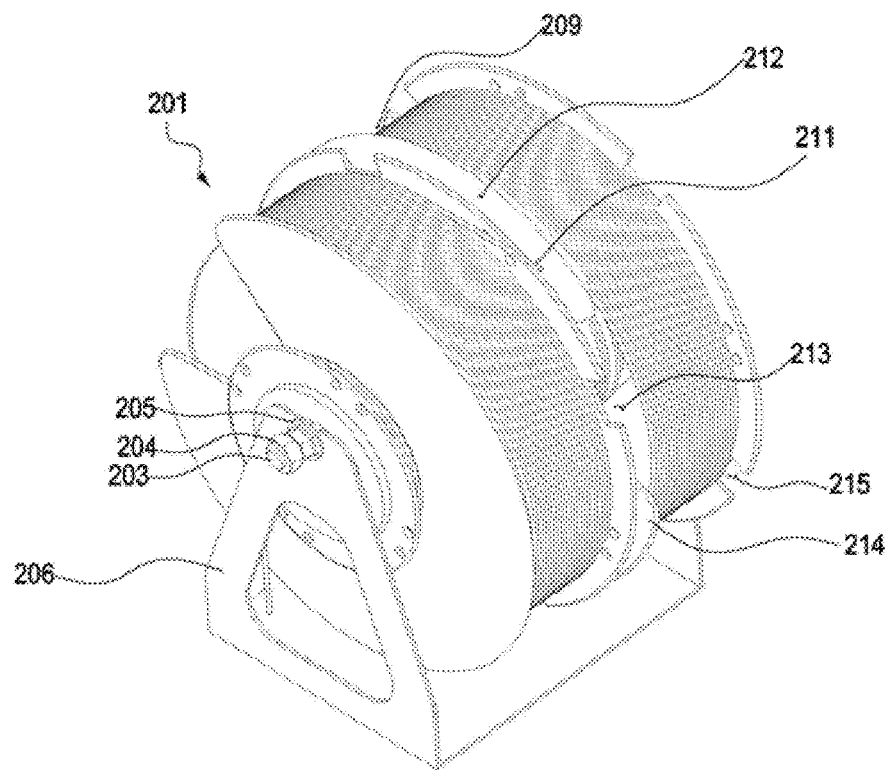

[FIG.7]
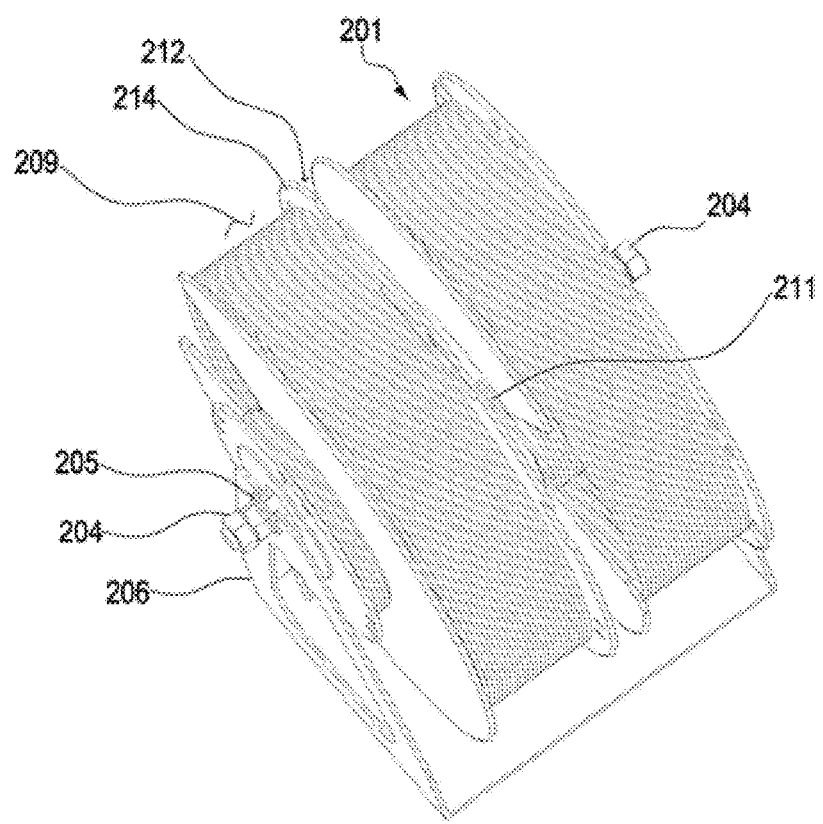

[FIG.8]
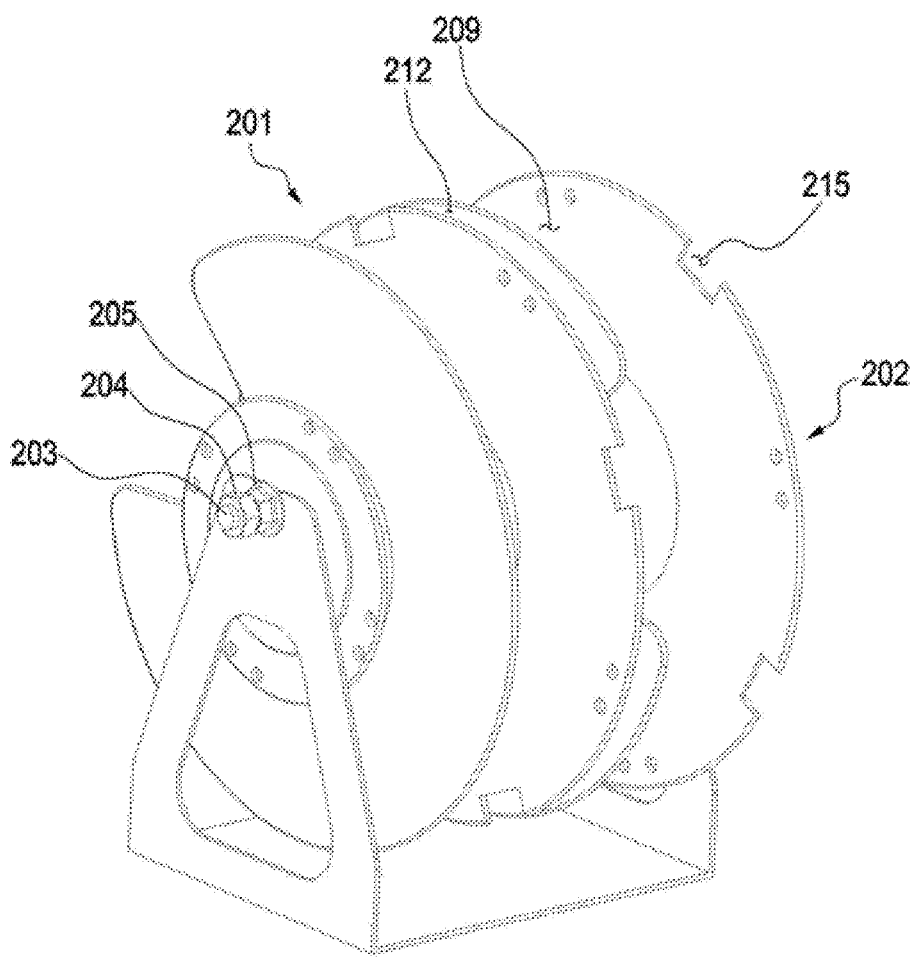

[FIG.9]
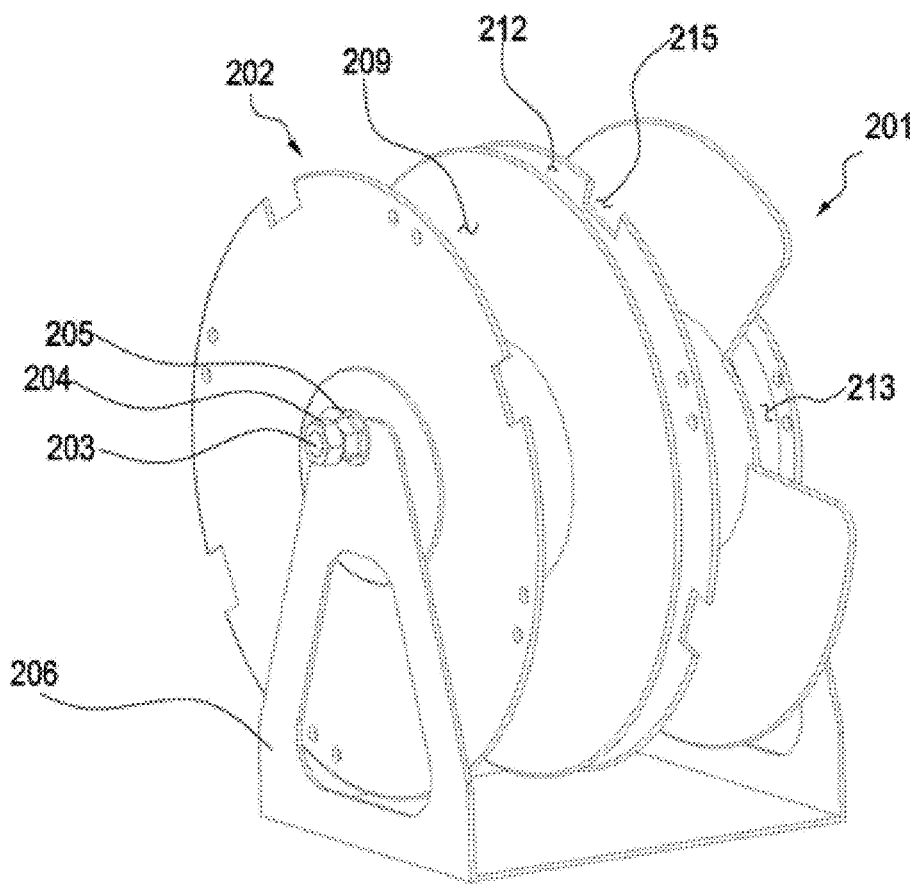

AUTOMATIC FILAMENT EXCHANGING METHOD OF 3D PRINTERS

TECHNICAL FIELD

The present invention relates to an automated filament exchange device and method. More particularly, the present invention relates to an automated filament exchange device and method that is configured to allow filaments for use in a 3D printer between spools on which the filaments are wound to be connected to each other.

BACKGROUND ART

Among some 3D printing methods, generally, a 3D printing method for fusing and depositing thermoplastic resin (which is commonly called FDM (Fused Deposition Method)) is carried out by fusing the thermoplastic resin to mold a long filament having a given diameter (about 1.75 mm or 3 mm), winding the filament on a spool, mounting the spool on a device, passing the filament fed from the spool through a nozzle on which a heater is mounted to allow the filament to be fused, and continuously depositing the liquid resin discharged from the nozzle, thereby printing a 3D product.

For example, in case where an expected amount of filament to be consumed (which is recognized through a program setting printing conditions) for a product to be newly made is over 100 g in the state where the amount of filament on a spool in use is 100 g, if printing starts, without any exchange of the spool in use, the consumption of the filament wound on the spool in use is observed. Just before the amount of filament on the spool in use is completely consumed, the spool in use has to be exchanged into a separate spool on which a new filament is wound.

Further, it is hard to expect whether the time at which the remaining amount of filament on the spool in use is consumed is night, dawn, weekend, etc., and accordingly, if it is desired to exchange the spool in use into the separate spool during the printing after the remaining amount of filament on the spool in use is consumed, a substantially large amount of manpower is needed. As a result, generally, the printing starts after the exchanging.

For these reasons, users who use the 3D printers through the FDM have a plurality of spools on which specific amounts of filaments are remaining, and if it is desired to make appropriate printing products for the spools, they try to exchange the spools into the spools in use and to consume the remaining amounts of filaments on the spools. Actually, it is very difficult to handle the remaining amounts of filaments on the spool.

So as to solve the above-mentioned problems, a filament welding machine has been proposed to weldedly connect two filaments to each other, but to do this, the remaining filament is unwound from the spool in use, connected to a filament of a new spool, and is wound on a spare space on the new spool, which still makes it difficult to continuously connect and use the spools.

DISCLOSURE

Technical Problem

Accordingly, the present invention has been made in view of the above-mentioned problems occurring in the prior art, and it is an object of the present invention to provide an automated filament exchange device and method that is capable of connecting a filament wound on a spool in use and a filament wound on a new spool to each other in a simple manner.

Technical Solution

To accomplish the above-mentioned object, according to the present invention, there is provided an automated filament exchange method wherein a spool for winding a first filament for a 3D printer is divided into a main space and a subspace and has main space flanges located on both sides of the main space and a subspace flange located outside the subspace in which the first filament is wound, the method including: the spool location step of locating the spool for winding the first filament for the 3D printer; the subspace first filament winding step of winding the first filament on the subspace of the spool located at the spool location step; the first filament location step of allowing the first filament wound at the subspace first filament winding step to pass through a gap formed on the main space flange located between the main space and the subspace; and the main space first filament winding step of winding the first filament located at the main space of the spool on the main space of the spool, wherein after the first filament is wound on the subspace of the spool, the first filament passes through the gap and is then wound multi-layeredly on the main space of the spool.

According to the present invention, desirably, the automated filament exchange method according to the present invention further includes: the separate spool location step of locating a separate spool for winding a second filament for a 3D printer; the subspace second filament winding step of winding the second filament on a subspace of the separate spool located at the separate spool location step in the state where the start end thereof is left, so that the start end of the second filament and the finishing end of the first filament are connected to each other; the second filament location step of allowing the second filament wound at the subspace second filament winding step to pass through a gap formed on a main space flange located between a main space and the subspace of the separate spool and locating the second filament at the main space of the separate spool; the main space second filament winding step of winding the second filament located at the main space of the separate spool on the main space of the separate spool; and the connection step of connecting the finishing end of the first filament wound on the main space of the spool and the start end of the second filament wound on the subspace of the separate spool.

According to the present invention, desirably, the second filament is unwound from the main space of the separate spool and is then unwound from the subspace of the separate spool through the gap formed on the main space flange, and as the start end of the second filament is connected to the finishing end of the first filament, the first filament is unwound from the main space of the spool and is then unwound from the subspace of the spool.

According to the present invention, desirably, the automated filament exchange method according to the present invention further includes: the separate spool removal step of removing the separate spool located on one side of the spool when the first filament wound on the spool is fed to the 3D printer after the second filament wound on the separate spool has been all consumed; the third filament preparation step of preparing a third filament wound after the separate spool has been removed; the spool rearrangement step of locating a separate spool on which the third filament is wound on one side of the spool; and the third filament connection step of connecting the finishing end of the first filament and the start end of the third filament to each other.

According to the present invention, desirably, the gap is formed on the main space flange disposed between the main space and the subspace, and the main space flange disposed outside the main space has a plurality of locking grooves equally spaced apart from each other along the outer peripheral surface thereof in such a manner as to be depressed toward the center thereof, so that the first filament and the second filament are locked onto the locking grooves and are thus connected to each other.

According to the present invention, desirably, both sides of each locking groove are depressed horizontally to each other, and the bottom side of each locking groove is perpendicular to both sides thereof.

According to the present invention, desirably, the automated filament exchange method according to the present invention after the connection step further includes: the spool tray preparation step of locating the spool and the separate spool in a spool tray in such a manner as to allow the subspace of the separate spool to face the main space of the spool; and the coupling step of coupling the spool and the separate spool through a shaft and fastening nuts and end caps to both ends of the shaft, wherein if the second filament wound on the separate spool is completely consumed, the first filament wound on the spool is used, and after that, if the first filament is completely consumed, the finishing end of the first filament is connected to the start end of another filament wound on the subspace of the separate spool after wound on the main space, so that the filaments can be continuously fed to the 3D printer, without any stop.

Advantageous Effects

According to the present invention, the automated filament exchange device and method is configured to allow the spool in use and the new spool to be at the same time connected to each other if it is desired to connect the finishing end of the filament in use and the start end of the filament wound on the new spool.

In addition, the automated filament exchange device and method is configured to allow the filaments to be continuously fed, thereby advantageously performing printing for a substantially long period of time.

Further, the automated filament exchange device and method is configured to allow the filaments to be completely consumed, without any portion left, thus to give economical advantages and to reduce an amount of waste, thus to give environmentally friendly effects.

DESCRIPTION OF DRAWINGS

FIG. 4 is a perspective view showing the state where after the spool in use and the new spool are mounted on a coaxial shaft, their filaments are connected to each other.

FIG. 5 is a perspective view showing the filament welding principle of a filament welding machine.

FIGS. 6 to 9 are perspective views showing states where locking grooves are formed on flanges of the automated filament exchange device according to the present invention.

BEST MODE FOR INVENTION

Figure 1:
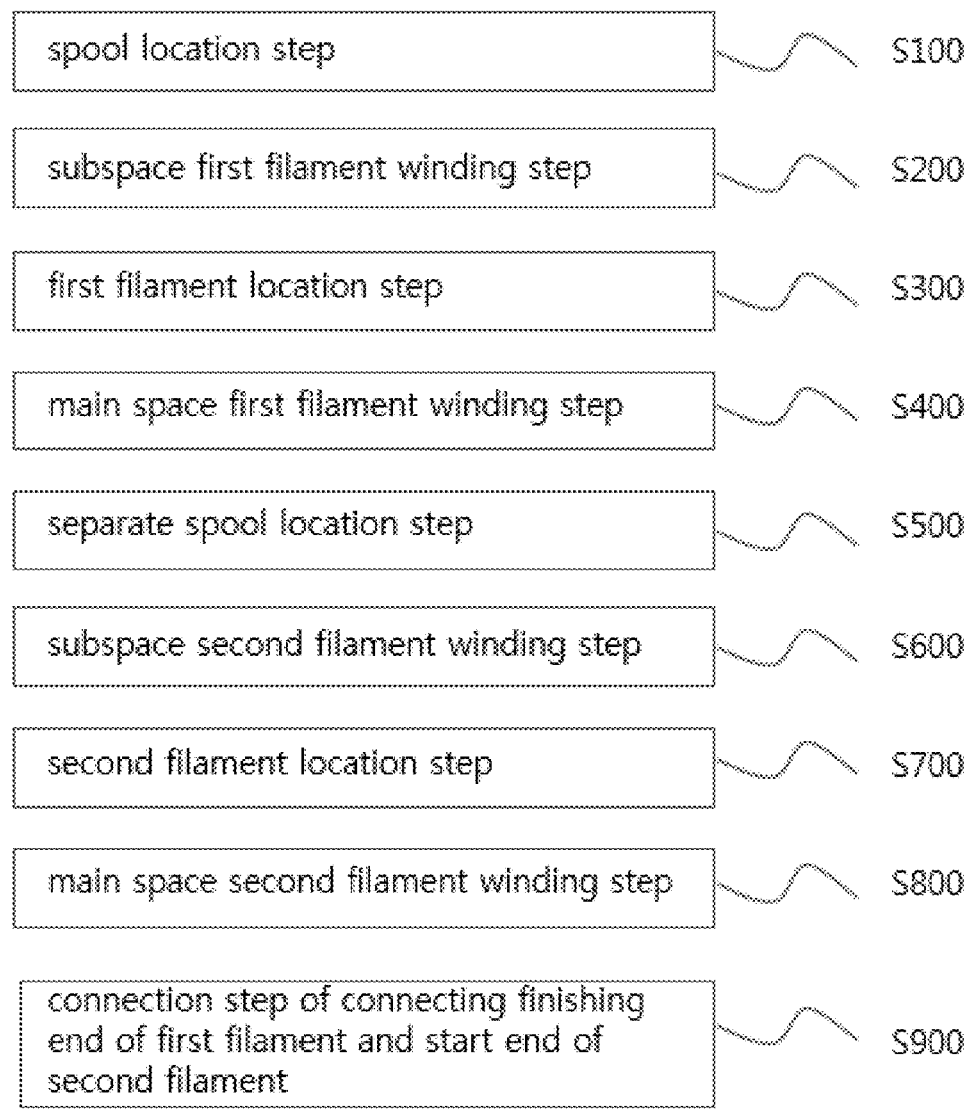
FIG. 1 is a flowchart showing an automated filament exchange method according to the present invention.

FIG. 1 is a flowchart showing an automated filament exchange method according to the present invention.

As shown in FIG. 1, an automated filament exchange method according to the present invention includes a spool location step S100, a subspace first filament winding step S200, a first filament location step S300, and a main space first filament winding step S400.

The spool location step S100 is carried out by locating a spool for winding a first filament for a 3D printer thereon.

The subspace first filament winding step S200 is carried out by winding the first filament on a subspace of the spool located at the spool location step S100.

The first filament location step S300 is carried out by allowing the first filament wound at the subspace first filament winding step S200 to pass through a gap of the spool and locating the first filament at a main space of the spool.

The main space first filament winding step S400 is carried out by winding the first filament located at the main space of the spool on the main space of the spool.

After one layer of the first filament is wound on the subspace of the spool, the first filament passes through the gap of the spool and is then wound multi-layeredly on the main space of the spool.

After the main space first filament winding step S400. at this time, the automated filament exchange method according to the present invention further includes a separate spool location step S500, a subspace second filament winding step S600, a second filament location step S700, a main space second filament winding step S800, and a connection step S900.

The separate spool location step S500 is carried out by locating a separate spool for winding a second filament for 3D printers thereon.

The subspace second filament winding step S600 is carried out by winding the second filament on a subspace of the separate spool located at the separate spool location step S500, and in this case, the second filament is wound in the state where its start end is being left, so that the start end of the second filament and the finishing end of the first filament are connected to each other.

The second filament location step S700 is carried out by allowing the second filament wound at the subspace second filament winding step S600 to pass through a gap of the separate spool and locating the second filament at a main space of the separate spool.

The main space second filament winding step S800 is carried out by winding the second filament located at the main space of the separate spool on the main space of the separate spool.

The connection step S900 is carried out by connecting the finishing end of the first filament wound on the main space of the spool and the start end of the second filament wound on the subspace of the separate spool after the subspace second filament winding step S600.

At this time, main space flanges are disposed on both sides of the main spaces on which the first filament and the second filament are wound.

Further, subspace flanges are disposed outside the subspaces on which the first filament and the second filament are wound.

In detail, the second filament is unwound from the main space of the separate spool and is then unwound from the subspace of the separate spool through the gap formed on the main space flange, and as the start end of the second filament is connected to the finishing end of the first filament, the first filament is unwound from the main space of the spool and is then unwound from the subspace of the spool.

At this time, the gap is formed on the main space flange disposed between the main space and the subspace, and the main space flange disposed outside the main space has a plurality of locking grooves equally spaced apart from each other along the outer peripheral surface thereof in such a manner as to be depressed toward the center thereof.

Accordingly, the first filament and the second filament are locked onto the locking grooves and are thus connected to each other.

At this time, both sides of each locking groove are depressed horizontally to each other, and the bottom side of each locking groove is perpendicular to both sides thereof.

Further, the automated filament exchange method according to the present invention includes a separate spool removal step, a third filament preparation step, a rearrangement step, and a third filament connection step.

The separate spool removal step is carried out by removing the separate spool located on one side of the spool when the first filament wound on the spool is fed to the 3D printer after the second filament wound on the separate spool has been all consumed.

The third filament preparation step is carried out by preparing a third filament wound after the separate spool has been removed.

The rearrangement step is carried out by locating a separate spool on which the third filament is wound on one side of the spool.

The third filament connection step is carried out by connecting the finishing end of the first filament and the start end of the third filament to each other.

Further, the automated filament exchange method according to the present invention includes a spool tray preparation step and a coupling step.

The spool tray preparation step is carried out by locating the spool and the separate spool in a spool tray in such a manner as to allow the subspace of the separate spool to face the main space of the spool.

The coupling step is carried out by coupling the spool and the separate spool through a shaft and fastening nuts and end caps to both ends of the shaft.

In detail, if the second filament wound on the separate spool is completely consumed, the first filament wound on the spool is used, and after that, if the first filament is completely consumed, the finishing end of the first filament is connected to the start end of another filament wound on the subspace of the separate spool after wound on the main space, so that the filaments can be continuously fed to the 3D printer, without any stop.

Hereinafter, an explanation on an automated filament exchange device (hereinafter, referred to as 'spool') according to the present invention will be in detail given with reference to the attached drawings.

First, the spool is adapted to wind up the filament for the 3D printer.

The automated filament exchange device according to the present invention includes a filament winding subspace, a spool, and a connection portion.

The filament winding subspace is formed at one side of a filament winding main space 102 on one spool 201 for winding the filament.

A spool 202 is attached to one side of the subspace 103.

At this time, the spool 202 is separately provided, and the subspace 103 is formed between one spool 201 and the separate spool 202.

Further, the filament winding main space 102 and the filament winding subspace 103 on one spool 201 are divided by means of a flange 105, and the flange 105 has a gap 104 formed thereon to allow the filament wound on the filament winding subspace 103 to be wound on the filament winding main space 102.

At this time, the gap 104 is enlarged outwardly so that when the filament is unwound to move from the main space 102 to the subspace 103, it is not locked onto the gap 104.

The connection portion 210 serves to connect the finishing end of the filament wound on one spool and the start end of the filament wound on the separate spool to each other.

In detail, if the filament wound on one spool is all consumed, the filament wound on the separate spool 202 is continuously used through the connection portion 210.

Further, the flange 105 has a plurality of locking grooves 215 equally spaced apart from each other along the outer peripheral surface thereof in such a manner as to be depressed toward the center thereof.

At this time, both sides of each locking groove 215 are depressed horizontally to each other.

Also, the bottom side of each locking groove 215 is perpendicular to both sides thereof.

In detail, the filament almost consumed is locked onto one of the locking grooves 215 on the spool on which it is wound and thus moves to the spool 202 on which the new filament is wound.

Hereinafter, the automated filament exchange device according to the present invention will be in more detail explained.

Figure 2:
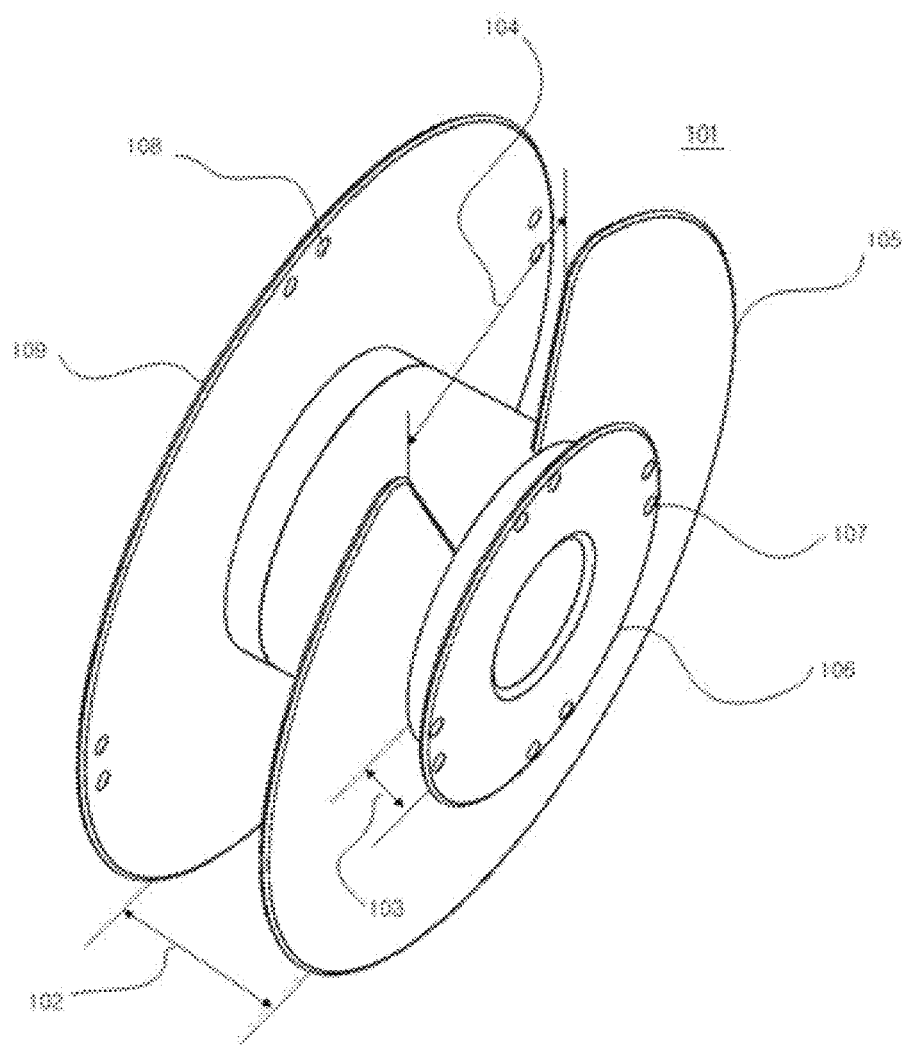
FIG. 2 is a perspective view showing respective parts of an automated filament exchange device according to the present invention.

FIG. 2 shows a structure of the spool according to the present invention. The spool is configured to allow the main space 102 in which the filament is mainly wound and the subspace in which only one layer of filament is wound to be divided by means of the flange 105, and the gap 104 is formed on the flange 105 dividing the main space 102 and the subspace 103.

The filament is wound on the spool 101 having the above configuration by means of the following method.

First, one end of the filament is inserted into one of filament fixing holes 107 formed on an outer flange 106 disposed outside the subspace 103 of the spool 101 and is then wound on the subspace 103. At this time, only one layer of filament on the subspace 103 is wound on the outer circumference of the center shaft of the spool 101.

If the only one layer of filament wound on the subspace 103 reaches the gap 104, the filament obliquely passes through the gap 104 and reaches the main space 102. Next, it is still wound in its winding direction.

Like this, the filament is wound up to an outer flange 109 disposed outside the main space 102, and next, another layer of filament is wound. Accordingly, if the filament reaches the flange 105 dividing the main space and the subspace, yet another layer of filament is wound up to the outer flange 109 of the main space 102. The above-mentioned operations are repeatedly carried out, so that if the filament is wound until the main space 102 is completely filled, the finishing end of the filament is inserted into one of filament fixing holes 108 formed on the outer flange 109 of the main space 102.

Figure 3:
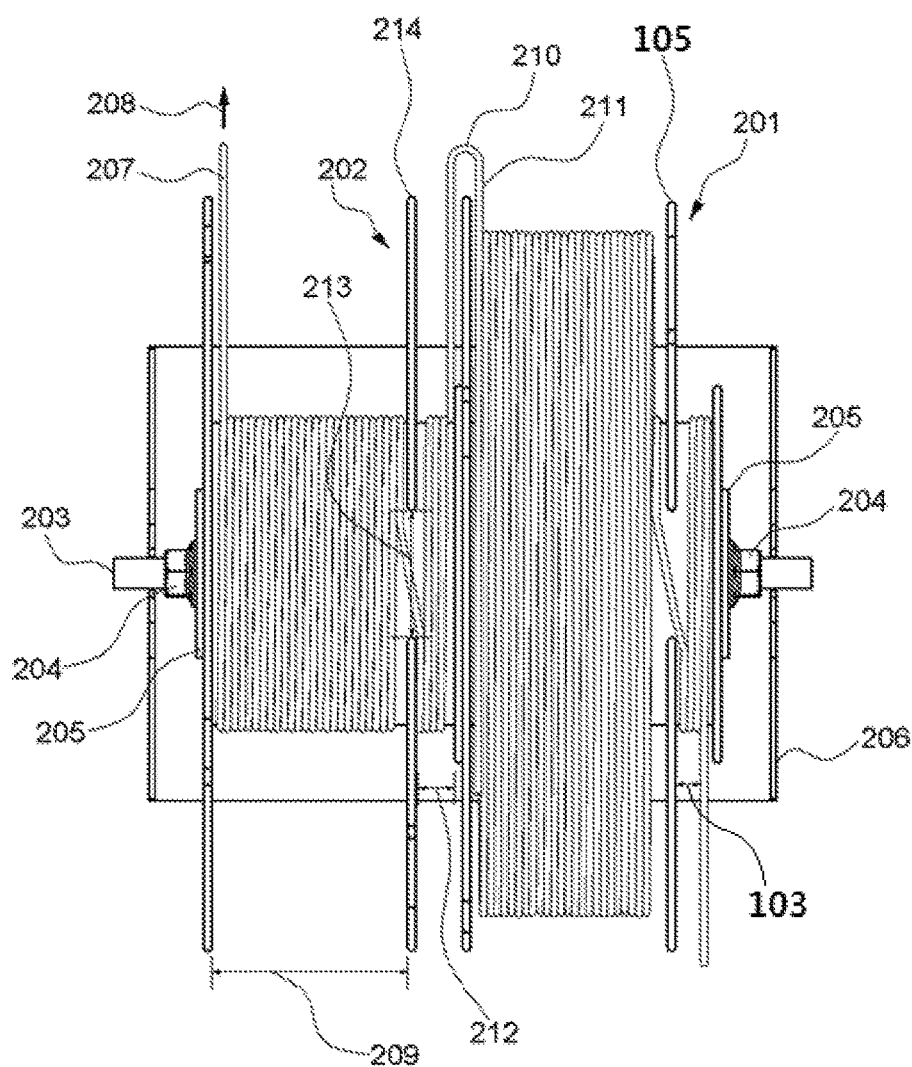
FIG. 3 is a plan view showing a state where after a spool in use and a new spool are mounted on a coaxial shaft, their filaments are connected to each other.

FIG. 3 is a plan view showing a state where after a new spool on which the filament is fully wound and a spool on which the filament is almost consumed are connected on a coaxial shaft to each other, the filament ends of the spools are connected to each other.

As shown in FIG. 3, the spool 202 almost used is coupled to the new spool 201 by means of a shaft 203, nuts 204, and end caps 205, and next, they are mounted on a spool tray 206.

A filament 207 in use is fed to equipment using the filament in a direction of an arrow 208.

If the filament 207 is all consumed to reach a flange 214 located at the end of a main space 209, it passes through a gap 213 formed on the flange 214 and thus moves to a subspace 212.

The subspace 212 serves as a kind of a buffer, that is, as a space in which a given spare filament, as required for the connection to a filament of the new spool by means of a welding machine, is wound. If no subspace 212 exists, the filament drawn from the gap 213 may be bent or broken during packaging or delivery, and accordingly, the subspace 212 functions to allow the filament to be safely kept in the state of being wound thereon.

The filament 207 moving to the subspace 212 naturally moves to a filament 211 of the new spool 201 connected to the spool 202 by means of the connection portion 210.

The connection of the two filaments is carried out by means of a filament welding machine as shown in FIG. 5.

A feeding speed of the filament for the 3D printer is several millimeters per second, which is substantially low, so that even in the state where 3D printing is carried out, without any stop, a set of a spool after use and a spool in use is detached from the spool tray 206, and the shaft 203, the nuts 204 and the end caps 205 are unfastened from each other to remove the spool after use from the set. Next, the spool in use is pushed to the place where the empty spool has been located, and a new spool is addedly provided. After that, the spool in use and the new spool are coupled to each other through the shaft 203, the nuts 204 and the end caps 205, and after the finishing end of the filament of the spool in use is connected to the start end of the filament of the new spool by means of the filament welding machine, the coupled spools are mounted on the spool tray 206. In this case, the above-mentioned filament exchanging operation does not any influence on the 3D printing, but after the 3D printing stops, if necessary, the filament exchanging operation may be carried out.

Like this, as shown in FIG. 2, if the spool having the gap and the subspace is adopted, the problem the existing spool has had, that is, the remaining amount of filament is not completely consumed, can be perfectly solved.

FIGS. 6 to 9 are perspective views showing states where locking grooves are formed on flanges of the automated filament exchange device according to the present invention.

As shown in FIGS. 6 to 9, each flange has the plurality of locking grooves 215 equally spaced apart from each other along the outer peripheral surface thereof in such a manner as to be depressed toward the center thereof.

At this time, both sides of each locking groove 215 are depressed horizontally to each other.

Also, the bottom side of each locking groove 215 is perpendicular to both sides thereof.

In detail, the filament wound on the spool almost used is locked onto one of the locking grooves 215 and thus moves to the spool 201 on which the new filament is wound.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

EXPLANATIONS ON REFERENCE NUMERALS

101. Spool 102. Main space in which filament is wound
103. Subspace in which filament is wound
104. Gap formed on flange dividing main space and subspace
105. Flange dividing main space and subspace
106. Flange defining end of subspace
107. Filament finishing end fixing hole formed on flange 106
108. Filament start end fixing hole formed on flange 109
109. Flange defining end of main space
201. Spool on which new filament is wound
202. Spool on which filament almost used is wound
203. Shaft passing through center holes of two spools
204. Nuts for fixing both ends of the shaft 203
205. End caps for preventing nuts 204 from being inserted into the center holes of the spools
206. Frame for supporting a set of spools connected to each other
207. Filament in use
208. Filament supply direction to equipment
209. Main space in which filament is wound
210. Portion on which two filaments are connected
211. New filament
212. Subspace in which filament is wound
213. Gap formed on flange dividing main space and subspace
214. Flange dividing main space and subspace
215. Locking groove
401. Finishing end of filament in use
402. Start end of new filament
403. Heater
404. Cap of filament welding machine

The invention claimed is:

1. An automated filament exchange method wherein an automated filament exchange device is adopted, the device including a separate spool (202) having a main space and a subspace formed at one side of the main space of the separate spool (202) for winding a second filament for a 3D printer, a spool (201) having a main space and a subspace formed at one side of the main space of the spool (201) for winding a first filament for a 3D printer, the spool (201) attached to one side of the subspace of the separate spool (202) so that the subspace of the separate spool (202) is located between the spool (201) and the separate spool (202), and a connection portion (210) adapted to connect a start end of the second filament wound on the separate spool (202) and a finishing end of the first filament wound on the spool (201) so that after the second filament wound on the separate spool (202) is all consumed, the first filament wound on the spool (201) is continuously consumed through the connection portion (210), the method comprising:

winding the first filament on the subspace of the spool (201);

allowing the first filament wound on the subspace of the spool (201) to pass through a gap formed on a flange located between the main space and the subspace of the spool (201) and locating the first filament at the main space of the spool (201);

winding the first filament located at the main space of the spool (201) on the main space of the spool (201), wherein the first filament is wound multi-layeredly on the main space of the spool (201);

winding the second filament on the subspace of the separate spool (202);

allowing the second filament wound on the subspace of the separate spool (202) to pass through a gap formed on a flange located between the main space and the subspace of the separate spool (202) and locating the second filament at the main space of the separate spool (202);

winding the second filament located at the main space of the separate spool (202) on the main space of the separate spool (202); and connecting the finishing end of the first filament wound on the main space of the spool (201) and the start end of the second filament wound on the subspace of the separate spool (202), wherein the second filament is unwound from the main space of the separate spool (202) and is then unwound from the subspace of the separate spool (202) through the gap formed on the flange of the separate spool (202), and as the start end of the second filament is connected to the finishing end of the first filament, the first filament is continuously unwound from the main space of the spool (201) along the connection portion (210) connecting the start end of the second filament and the finishing end of the first filament and is then unwound from the subspace of the spool (201).

\* \* \* \* \*